United States Patent
Nagaoka et al.

(10) Patent No.: US 8,973,348 B2
(45) Date of Patent: Mar. 10, 2015

(54) EXHAUST GAS PURIFICATION DEVICE

(75) Inventors: Daiji Nagaoka, Fujisawa (JP); Teruo Nakada, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 105 days.

(21) Appl. No.: 13/640,966

(22) PCT Filed: Apr. 13, 2011

(86) PCT No.: PCT/JP2011/059153
§ 371 (c)(1), (2), (4) Date: Oct. 12, 2012

(87) PCT Pub. No.: WO2011/129359
PCT Pub. Date: Oct. 20, 2011

(65) Prior Publication Data
US 2013/0025264 A1 Jan. 31, 2013

(30) Foreign Application Priority Data
Apr. 15, 2010 (JP) .................. 2010-094342

(51) Int. Cl.
*F01N 3/00* (2006.01)
*F02D 41/02* (2006.01)
(Continued)

(52) U.S. Cl.
CPC .......... *F02D 41/025* (2013.01); *B01D 53/9477* (2013.01); *F01N 3/106* (2013.01); *F01N 11/005* (2013.01); *F02D 41/1447* (2013.01); *F02D 41/405* (2013.01); *B01D 53/9409* (2013.01);
(Continued)

(58) Field of Classification Search
USPC .................................. 60/272–324
See application file for complete search history.

(56) References Cited

U.S. PATENT DOCUMENTS

| | | | | |
|---|---|---|---|---|
| 7,062,904 B1* | 6/2006 | Hu et al. | .......... | 60/286 |
| 8,037,673 B2* | 10/2011 | Gonze et al. | .......... | 60/284 |
| 8,365,517 B2* | 2/2013 | Gonze et al. | .......... | 60/286 |
| 8,484,959 B2* | 7/2013 | Tsujimoto et al. | .......... | 60/303 |
| 8,539,757 B2* | 9/2013 | Hirota et al. | .......... | 60/286 |

(Continued)

FOREIGN PATENT DOCUMENTS

| | | |
|---|---|---|
| JP | 9-170429 A | 6/1997 |
| JP | 2007-170218 A | 7/2007 |

(Continued)

OTHER PUBLICATIONS

A Search Report issued in corresponding International Appln. No. PCT/JP2011/059153 dated Jun. 14, 2011 (2 Pages).

*Primary Examiner* — Jesse Bogue
(74) *Attorney, Agent, or Firm* — McCormick, Paulding & Huber LLP

(57) ABSTRACT

The exhaust gas purification device includes an exhaust gas post-processing device 30 provided in an exhaust passage 11 of an engine 10, an exhaust injection valve 22, a first catalyst 35, a second catalyst 36 for thermally decomposing fuel injected by the exhaust injection valve 22, an exhaust temperature estimation unit 41 for estimating an exhaust temperature, an engine injection control unit 42 for controlling fuel injection in the engine 10, and regeneration control units 43, 44 for controlling regeneration of the exhaust gas post-processing device 30. When an output value output by the exhaust gas temperature estimation unit 41 is equal to or lower than a threshold during regeneration by the regeneration control units 43, 44, the engine injection control unit 42 controls fuel injection in the engine by performing a multi-stage injection, which includes a post injection for supplying fuel to the first catalyst 35.

10 Claims, 5 Drawing Sheets

(51) Int. Cl.
*B01D 53/94* (2006.01)
*F01N 3/10* (2006.01)
*F01N 11/00* (2006.01)
*F02D 41/14* (2006.01)
*F02D 41/40* (2006.01)

(52) U.S. Cl.
CPC ......... *B01D 53/944* (2013.01); *B01D 2251/208* (2013.01); *B01D 2279/30* (2013.01); *F01N 2560/06* (2013.01); *F01N 2610/03* (2013.01); *F01N 2900/1602* (2013.01); *Y02T 10/44* (2013.01); *Y02T 10/26* (2013.01); *Y02T 10/47* (2013.01); *F01N 2510/0684* (2013.01)
USPC .................... 60/285; 60/286; 60/295; 60/299

(56) References Cited

U.S. PATENT DOCUMENTS

| | | | |
|---|---|---|---|
| 2008/0102010 A1* | 5/2008 | Bruck et al. | 423/213.2 |
| 2010/0192544 A1* | 8/2010 | Tsujimoto | 60/277 |
| 2011/0113763 A1* | 5/2011 | Hirota | 60/300 |
| 2012/0060480 A1* | 3/2012 | Tanaka | 60/286 |

FOREIGN PATENT DOCUMENTS

| | | | | |
|---|---|---|---|---|
| JP | 2008-157069 A | | 7/2008 | |
| JP | 2008157069 A | * | 7/2008 | ............... F01N 3/24 |
| JP | 2009-019556 A | | 1/2009 | |
| JP | 2009019556 A | * | 1/2009 | ............... F01N 3/28 |

\* cited by examiner

EXHAUST GAS PURIFICATION DEVICE

CROSS REFERENCE TO RELATED APPLICATIONS

This application is entitled to the benefit of and incorporates by reference essential subject matter disclosed in International Patent Application No. PCT/JP2011/059153 filed on Apr. 13, 2011 and Japanese Patent Application No. 2010-094342 filed on Apr. 15, 2010.

TECHNICAL FIELD

The present invention relates to an exhaust gas purification device that includes an exhaust gas post-processing device provided in an exhaust passage of an internal combustion engine and an in-exhaust pipe injection valve provided on an upstream side of the exhaust gas post-processing device.

BACKGROUND ART

A DPF (diesel particulate filter) that traps particulate matter (PM) contained in exhaust gas and an LNT (LNT occlusion reduction catalyst) that reduces and purifies NOx are used in a diesel engine (internal combustion engine) as an exhaust gas post-processing device. Further, an in-exhaust pipe injection, in which fuel is injected directly into an exhaust pipe, is known as a method of forcibly regenerating the DPF and the LNT. An in-exhaust pipe injection is advantaged over a post injection in that oil dilution by the injected fuel does not occur. Further, EGR can be performed in conjunction with the forcible regeneration of the exhaust gas post-processing device, and therefore NOx deterioration and the like can be prevented.

The fuel injected during the in-exhaust pipe injection reaches the downstream side DPF and LNT while being thermally decomposed (vaporized), raises the temperatures of the respective catalysts through combustion of HC and CO, and thus functions as a NOx reducing agent. A temperature at which thermal decomposition of the injected fuel into HC and CO begins is no lower than 200° C. to 250° C., and therefore, to prevent the fuel from adhering to the exhaust pipe and so on, the in-exhaust pipe injection is preferably performed when an exhaust gas temperature is no lower than 200° C. to 250° C. Hence, when the in-exhaust pipe injection is performed at an exhaust gas temperature equal to or lower than 200° C., for example during idling, a multistage injection must be performed concurrently in order to raise the temperature of the exhaust gas.

Japanese Patent Application Publication No. 2007-170218, for example, discloses an exhaust gas purification device in which a NOx occlusion reduction catalyst is provided in an exhaust passage of an internal combustion engine, and which is capable of performing an in-exhaust pipe injection and a multistage injection concurrently during NOx reduction control.

DISCLOSURE OF THE INVENTION

An injection pattern of the multistage injection performed to raise the temperature of the exhaust gas is greatly retarded in comparison with a normal injection, and therefore combustion is concentrated in an expansion stroke. Hence, during acceleration, an air-fuel ratio λ decreases, leading to a reduction in an in-cylinder pressure, and as a result, combustion may become unstable, causing the drivability to deteriorate due to acceleration failure or the like.

Further, when the multistage injection is halted and the normal injection is performed in an operating condition other than idling, the exhaust gas temperature decreases in a low load region. When the in-exhaust injection is performed in this state, the injected fuel (diesel oil) is not thermally decomposed and therefore adheres to the exhaust pipe. Hence, when the exhaust gas temperature increases, the adhered fuel may be vaporized, and as a result, smoke may be generated.

Furthermore, in a low exhaust gas temperature atmosphere where the exhaust gas temperature is low, the fuel (diesel oil) injected in the exhaust pipe arrives at the downstream side catalysts before reaching a state of advanced decomposition, and therefore filter clogging, in which the fuel blocks front surfaces of the catalysts, may occur. Moreover, during forcible regeneration (rich spiking) of the LNT, a NOx reduction efficiency may decrease such that HC slip deteriorates.

The present invention has been designed in consideration of these problems, and an object thereof is to provide an exhaust gas purification device with which a low temperature characteristic of an exhaust gas post-processing device can be improved, a NOx reduction and purification rate can be increased, and smoke generation can be effectively reduced by means of a simple configuration.

To achieve the object described above, an exhaust gas purification device according to the present invention includes an exhaust gas post-processing device provided in an exhaust passage of an internal combustion engine, exhaust passage fuel injecting means provided in the exhaust passage on an upstream side of the exhaust gas post-processing device, a first catalyst provided in the exhaust passage on an upstream side of the exhaust passage fuel injecting means, a second catalyst provided in the exhaust passage between the exhaust passage fuel injecting means and the exhaust gas post-processing device in order to perform thermal decomposition on fuel injected by the exhaust passage fuel injecting means, exhaust gas temperature estimating means for detecting or estimating and outputting an exhaust gas temperature of the internal combustion engine, internal combustion engine injection control means for controlling fuel injection in the internal combustion engine, and regeneration control means for controlling regeneration of the exhaust gas post-processing device, which is performed by causing the exhaust passage fuel injecting means to inject fuel, wherein, when an output value output by the exhaust gas temperature estimating means is equal to or lower than a threshold during regeneration control by the regeneration control means, the internal combustion engine injection control means controls the fuel injection in the internal combustion engine by performing a multistage injection, which includes a post injection for supplying fuel to the first catalyst, in order to raise a catalyst temperature of the second catalyst to or above a threshold.

The exhaust gas purification device may further include an electric heater provided in an upstream portion of the second catalyst and an electric heater control unit for controlling an operation of the electric heater, and the electric heater control unit may operate the electric heater when the output value output by the exhaust gas temperature estimating means is equal to or lower than the threshold during the regeneration control by the regeneration control means.

Further, the first catalyst and the second catalyst may each include a metal carrier and may be formed integrally with the exhaust passage.

Further, the exhaust gas post-processing device may include a DPF and an LNT occlusion reduction catalyst.

Further, the exhaust gas post-processing device may include a DPF and an SCR selective reduction catalyst.

With the exhaust gas purification device according to the present invention, a low temperature characteristic of an exhaust gas post-processing device can be improved, a NOx reduction and purification rate can be increased, and smoke generation can be effectively reduced by means of a simple configuration.

BEST MODES FOR CARRYING OUT THE INVENTION

Figure 1:
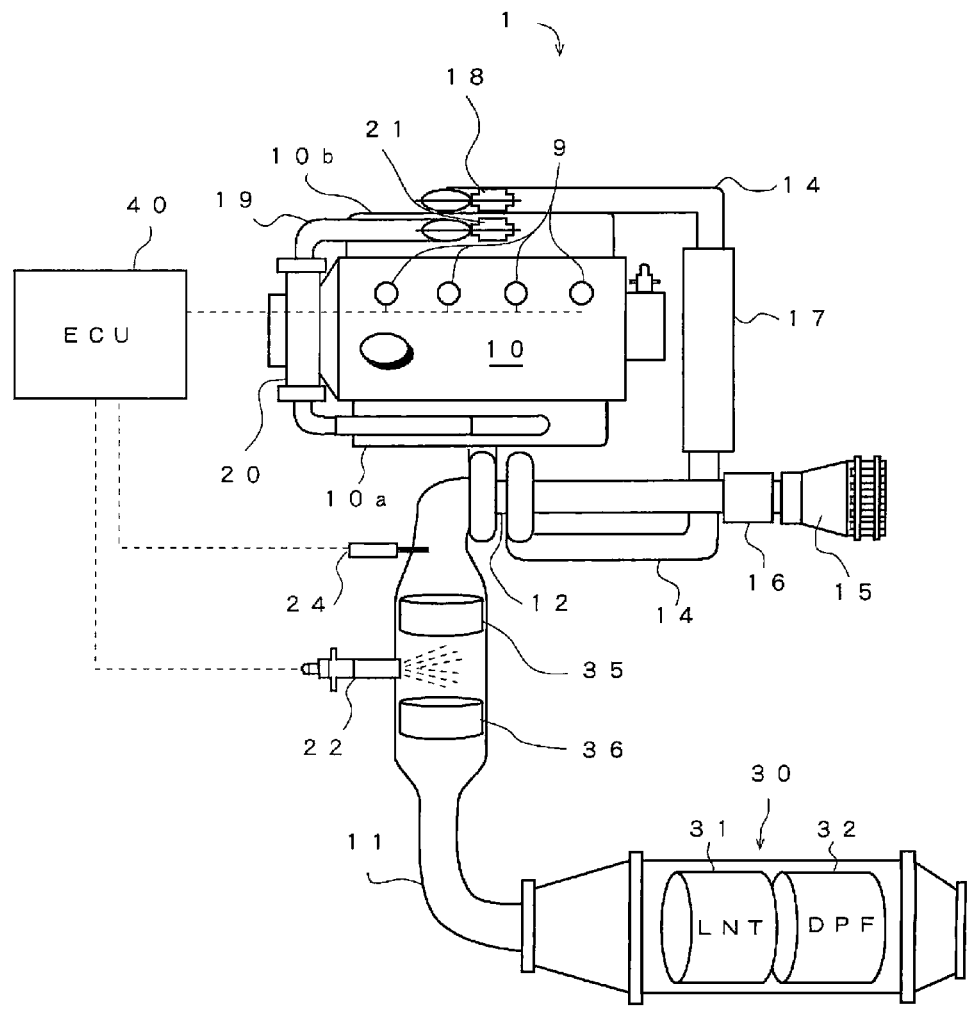
FIG. 1 is a schematic view of an exhaust gas purification device according to an embodiment of the present invention.

An embodiment of the present invention will be described below with reference to the drawings.

FIGS. 1 to 4 illustrate an exhaust gas purification device 1 according to this embodiment of the present invention. Identical components have been allocated identical reference numerals and have identical names and functions. Accordingly, detailed description of these components will not be repeated.

As shown in FIG. 1, a diesel engine (internal combustion engine) 10 is provided with an intake manifold 10b and an exhaust manifold 10a. Further, an intake passage 14 into which fresh air (intake air) is introduced by opening an intake value (not shown) provided in the diesel engine 10 is connected to the intake manifold 10b, and an exhaust passage 11 into which exhaust gas is discharged by opening an exhaust valve (not shown) is connected to the exhaust manifold 10a.

An intake throttle 18, an intercooler 17, a turbocharger 12, and a mass air flow sensor 16 are interposed on an upstream side of the intake passage 14, and an air filter 15 is provided on a tip end of the intake passage 14. The intake manifold 10b and the exhaust manifold 10a are connected by an EGR passage 19, and an EGR cooler 20 and an EGR valve 21 are provided in the EGR passage 19.

An exhaust gas post-processing device 30, to be described in detail below, is provided on a downstream side of the exhaust passage 11, and an oxidation catalyst (first catalyst) 35 is provided on an upstream side thereof. Further, a diesel oil decomposition catalyst (second catalyst) 36 that thermally decomposes (vaporizes) diesel oil serving as a fuel is provided in the intake passage 11 on a downstream side of the oxidation catalyst 35.

An in-exhaust pipe injection valve (exhaust passage fuel injecting means) 22 that injects the fuel into an exhaust pipe is provided between the oxidation catalyst 35 and the diesel oil decomposition catalyst 36. Further, an exhaust gas temperature sensor 24 that detects a temperature of the exhaust gas discharged from the diesel engine 10 is provided in the exhaust passage 11 on an upstream side of the oxidation catalyst 35.

The exhaust gas post-processing device 30 includes, in order from the upstream side, an LNT (LNT occlusion reduction catalyst) 31 and a DPF 32.

The LNT 31 has a conventional structure in which a NOx occluding material or the like is carried on a catalyst carrier having a honeycomb structure. The LNT 31 occludes NOx during a normal operation in a lean atmosphere and discharges the occluded NOx in a rich atmosphere so that the NOx is reduced to $N_2$ and thereby purified. A diesel engine is typically operated in a lean atmosphere. Hence, an LNT forcible regeneration control unit (regeneration control means) 44, to be described below, performs regeneration control on the LNT 31 by causing the in-exhaust pipe injection valve 22 to inject fuel, thereby temporarily creating a rich atmosphere in which the NOx is reduced to $N_2$ and purified.

The DPF (diesel particulate filter) 32 has a conventional structure in which respective interiors of a large number of cells forming a ceramic honeycomb structure constitute gas flow passages, upstream sides and downstream sides of which are sealed alternately. The DPF 32 traps PM (particulate matter) contained in the exhaust gas, and a PM forcible regeneration control unit (regeneration control means) 43, to be described below, performs regeneration control on the DPF 32 to burn and remove the accumulated PM by raising the DPF 32 to a PM combustion temperature (approximately 500° C., for example).

The oxidation catalyst 35 is formed by carrying platinum (Pt) or the like on a metal or ceramic carrier having a honeycomb structure. A temperature of the oxidation catalyst 35 is raised to or above an oxidation catalyst activation temperature (200° C. to 250° C., for example) by a post injection to be described below.

The diesel oil decomposition catalyst 36 decomposes a long chain component of the diesel oil into short chain HC and CO components, and is formed by carrying palladium (Pd) as a main component on a metal or ceramic carrier having a honeycomb structure. When the temperature of the oxidation catalyst 35 is raised by the post injection, which is performed by an engine injection control unit (internal combustion engine injection control means) 42 of a ECU 40 to be described below, such that the temperature of the exhaust gas passing through the oxidation catalyst 35 is raised to or above the catalyst activation temperature (200° C. to 250° C., for example), the diesel oil decomposition catalyst 36 thermally decomposes the fuel (diesel oil) injected by the in-exhaust pipe injection valve 22 during regeneration control of the LNT 31 and the DPF 32 rapidly into short chain HC and CO, and transmits the short chain HC and CO to the downstream side LNT 31 and DPF 32.

In this embodiment, respective volumes of the oxidation catalyst 35 and the diesel oil decomposition catalyst 36 are set such that an acceptable S/V (approximately 100000 hr-1, for example) is realized when the diesel engine 10 is in an idling to low load operating state, or in other words at an upper limit value at which catalyst activation can be secured. Further, when metal carriers are used in the oxidation catalyst 35 and the diesel oil decomposition catalyst 36, the oxidation catalyst 35 and the diesel oil decomposition catalyst 36 can be formed integrally with the exhaust passage 11, and as a result, the exhaust gas purification device 1 can be made more compact.

Next, the ECU 40 according to this embodiment will be described.

The ECU 40 has a conventional configuration including a CPU, a ROM, a RAM, an input port, an output port, and so on. Further, output signals from an engine rotation speed sensor (not shown), an accelerator opening sensor (not shown), an exhaust gas temperature sensor 24, and so on are subjected to A/D conversion and then input into the ECU 40.

Figure 2:
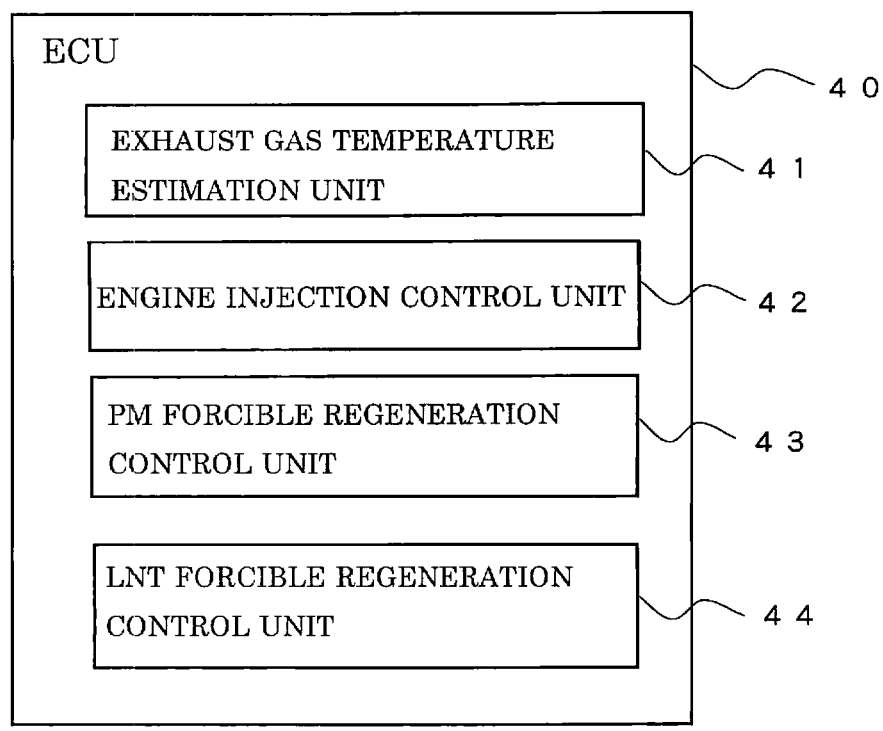
FIG. 2 is a block diagram showing an ECU of the exhaust gas purification device according to this embodiment of the present invention.

As shown in FIG. 2, the ECU 40 according to this embodiment includes, as a part of the functional elements thereof, an exhaust gas temperature estimation unit (exhaust gas temperature estimating means) 41, the engine injection control unit (internal combustion engine injection control means) 42, the PM forcible regeneration control unit (regeneration control means) 43, and the LNT forcible regeneration control unit (regeneration control means) 44. In this embodiment, these functional elements are included in the ECU 40 as integrated hardware, but any part thereof may be provided as separate hardware.

The exhaust gas temperature estimation unit (exhaust gas temperature estimating means) 41 estimates the temperature of the exhaust gas discharged from the diesel engine 10. The estimated temperature is calculated on the basis of a temperature characteristic map (not shown) that is created in advance and illustrates a relationship between a fuel injection amount and an exhaust gas amount.

The engine injection control unit (internal combustion engine injection control means) 42 controls fuel injection in the diesel engine 10. More specifically, when an estimated temperature Tc obtained by the exhaust gas temperature estimation unit 41 is equal to or lower than a threshold (200° C., for example), the engine injection control unit 42 outputs a control signal to a fuel injection valve 9 to cause the fuel injection valve 9 to perform a multistage injection in which the fuel is injected a plurality of times, i.e. in a pilot injection, a main injection, an after injection, and a post injection, within a single combustion stroke (intake—compression—explosion—discharge). When the estimated temperature Tc obtained by the exhaust gas temperature estimation unit 41 is higher than the threshold (200° C.), on the other hand, the engine injection control unit 42 outputs a control signal to the fuel injection valve 9 to cause the fuel injection valve 9 to perform a normal injection in which an appropriate amount of fuel corresponding to the operating state is injected once within a single combustion stroke.

Further, the engine injection control unit 42 is configured to control fuel injection in the diesel engine 10 by switching from the multistage injection to the normal injection when the catalyst temperature of the oxidation catalyst 35 is raised to or above the threshold (200° C.) by the post injection of the multistage injection, in which a small amount of fuel is injected at a predetermined timing, and maintained at or above 200° C. to 250° C. (to be referred to hereafter as a target temperature). Note that a detection value Ts obtained by the exhaust gas temperature sensor 24 may be used instead of the estimated temperature Tc obtained by the exhaust gas temperature estimation unit 41 as the exhaust gas temperature employed in this control.

The PM forcible regeneration control unit (regeneration control means) 43 performs PM forcible regeneration control to burn and remove the accumulated PM trapped in the DPF 32 by raising the temperature of the DPF 32 to the PM combustion temperature (approximately 500° C., for example). More specifically, pressure sensors (not shown) are provided on the upstream side and the downstream side of the exhaust gas post-processing device 30, and when a differential pressure between the pressure sensors reaches or exceeds a predetermined value and the estimated temperature Tc or the detection value Ts is higher than the threshold (200° C.), the PM forcible regeneration control is performed to supply fuel to the diesel oil decomposition catalyst 36 from the in-exhaust pipe injection valve 22. Thermal decomposition (vaporization) of the fuel (diesel oil) supplied to the diesel oil decomposition catalyst 36 advances under a temperature condition of no less than 200° C., and therefore the fuel is supplied to the downstream side DPF 32 in a thermally decomposed state.

The LNT forcible regeneration control unit (regeneration control means) 44 performs forcible regeneration control on the LNT 31 by temporarily setting the air-fuel ratio at a rich atmosphere. More specifically, when a NOx occlusion amount integrated on the basis of a NOx discharge map (not shown) having the engine rotation speed and the load as parameters equals or exceeds a predetermined value and the estimated temperature Tc or the detection value Ts is higher than the threshold (200° C.), rich spiking for temporarily creating a rich atmosphere is implemented by injecting fuel through the in-exhaust pipe injection valve 22. As a result of the rich spike, the NOx occluded by the LNT 31 is reduced and purified. Note that the LNT forcible regeneration control may be performed periodically at predetermined period intervals.

Figure 3:
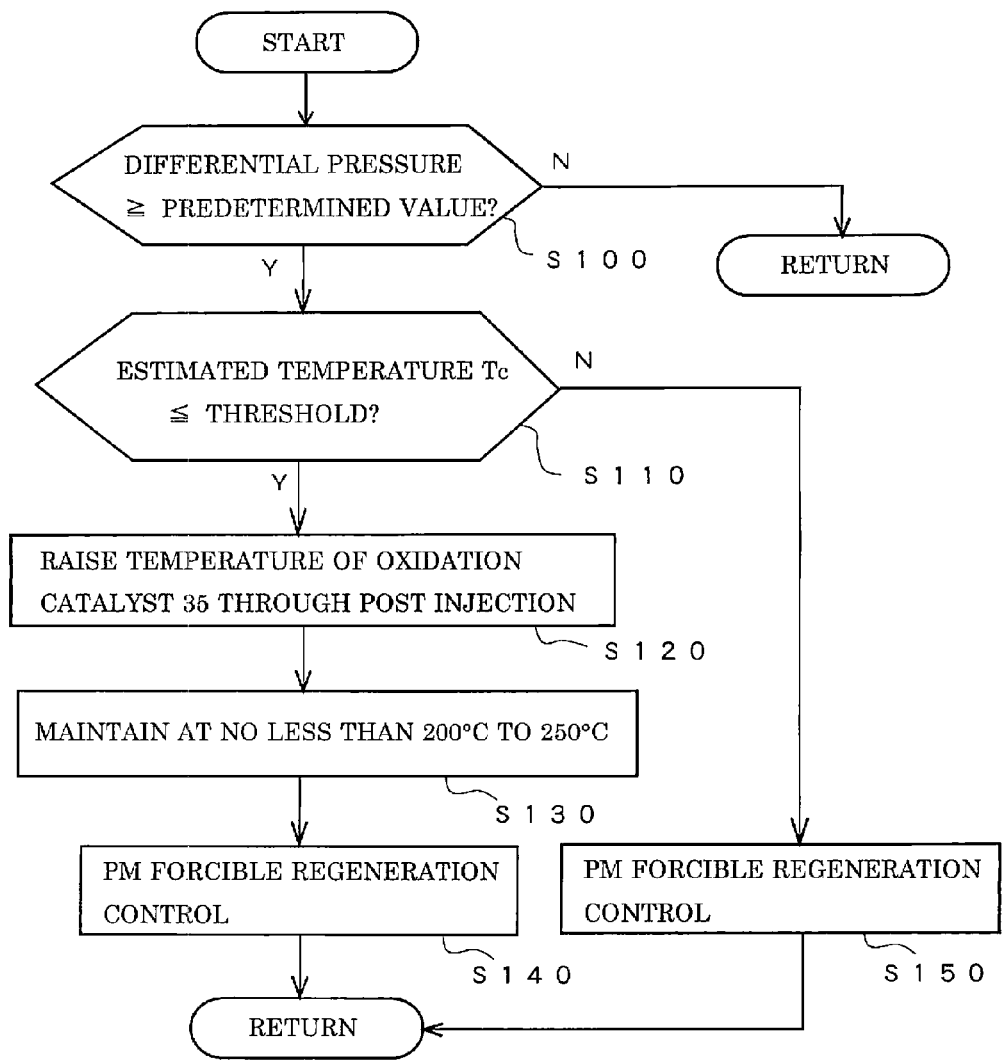
FIG. 3 is a flowchart showing PM forcible regeneration control executed by the exhaust gas purification device according to this embodiment of the present invention.
Figure 4:
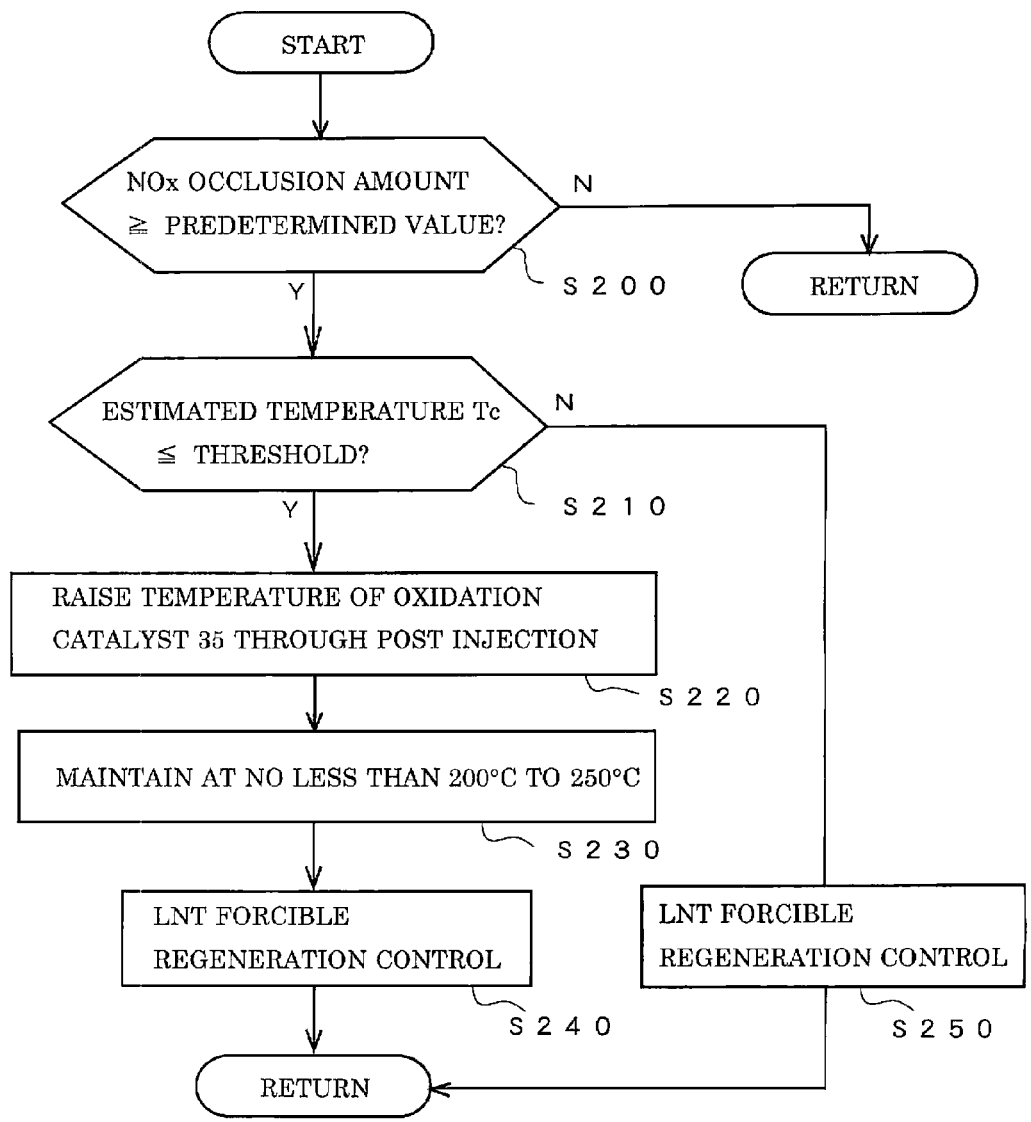
FIG. 4 is a flowchart showing LNT forcible regeneration control executed by the exhaust gas purification device according to this embodiment of the present invention.

In the exhaust gas purification device 1 according to this embodiment of the present invention, having the configuration described above, the following control is performed in accordance with flows shown in FIGS. 3 and 4, for example.

First, a PM forcible regeneration control flow shown in FIG. 3 will be described.

In Step (hereafter, Step will be abbreviated to S) 100, a determination is made on the basis of the differential pressure between the pressure sensors as to whether or not the trapped PM amount trapped in the DPF 32 has exceeded an allowable value. When the differential pressure is equal to or greater than a predetermined value, or in other words when the trapped PM amount has exceeded the allowable value, the control advances to S110. When the differential pressure is smaller than the predetermined value, on the other hand, or in other words when the trapped PM amount has not exceeded the allowable value, the control is returned.

In S110, a determination is made as to whether or not the estimated temperature Tc obtained by the exhaust gas temperature estimation unit 41 is equal to or lower than the threshold (200° C.). When the estimated temperature Tc is equal to or lower than the threshold, it is determined that the temperature of the oxidation catalyst 35 must be raised, and therefore the control advances to S120. When the estimated temperature Tc is higher than the threshold, on the other hand, it is determined that the temperature of the oxidation catalyst 35 does not need to be raised, and therefore the control advances to S150, where the PM forcible regeneration control is executed, after which the control is returned. Note that the detection value Ts obtained by the exhaust gas temperature sensor 24 may be used in this determination.

In S120, the post injection is executed by the engine injection control unit 42 to raise the catalyst temperature of the oxidation catalyst 35 to or above the threshold (200° C.).

In S130, the catalyst temperature of the oxidation catalyst 35, raised in S120, is maintained at the target temperature (no less than 200° C. to 250° C.) and the multistage injection is halted. Note that when the catalyst temperature of the oxidation catalyst 35 is maintained at the target temperature (no less than 200° C. to 250° C.), the temperature of the exhaust gas flowing in the vicinity of the in-exhaust pipe injection valve 22 and the catalyst temperature of the diesel oil decomposition catalyst 36 are likewise raised to and maintained at the target temperature (no less than 200° C. to 250° C.).

In S140, the PM forcible regeneration control for raising the DPF 32 to the PM combustion temperature (approximately 500° C., for example) by causing the in-exhaust pipe injection valve 22 to inject fuel is executed by the PM forcible regeneration control unit 43, whereupon the control is returned.

Next, the forcible regeneration control flow of the LNT 31, shown in FIG. 4, will be described.

In S200, a determination is made as to whether or not the NOx occlusion amount integrated on the basis of the NOx discharge map (not shown) is equal to or greater than a predetermined value. When the NOx occlusion amount is equal to or greater than the predetermined value, it is determined that a NOx occlusion capacity of the LNT 31 is in a saturated state, and therefore the control advances to S210. When the NOx occlusion amount is smaller than the predetermined value, on the other hand, the control is returned.

In S210, a determination is made as to whether or not the estimated temperature Tc obtained by the exhaust gas temperature estimation unit 41 is equal to or lower than the threshold (200° C.). When the estimated temperature Tc is equal to or lower than the threshold, it is determined that the temperature of the oxidation catalyst 35 must be raised, and therefore the control advances to S220. When the estimated temperature Tc is higher than the threshold, on the other hand, it is determined that the temperature of the oxidation catalyst 35 does not need to be raised, and therefore the control advances to S250, where the LNT forcible regeneration control is executed, after which the control is returned. Note that the detection value Ts obtained by the exhaust gas temperature sensor 24 may be used in this determination.

In S220, the post injection is executed by the engine injection control unit 42 to raise the catalyst temperature of the oxidation catalyst 35 to or above the threshold (200° C.).

In S230, the catalyst temperature of the oxidation catalyst 35, raised in S220, is maintained at the target temperature (no less than 200° C. to 250° C.) and the multistage injection is halted. Note that when the catalyst temperature of the oxidation catalyst 35 is maintained at the target temperature (no less than 200° C. to 250° C.), the temperature of the exhaust gas flowing in the vicinity of the in-exhaust pipe injection valve 22 and the catalyst temperature of the diesel oil decomposition catalyst 36 are likewise raised to and maintained at the target temperature (no less than 200° C. to 250° C.).

In S240, the LNT forcible regeneration control (rich spiking) for creating a rich atmosphere by causing the in-exhaust pipe injection valve 22 to inject fuel is executed by the LNT forcible regeneration control unit 44, whereupon the control is returned.

By employing the configuration described above, actions and effects such as the following can be obtained with the exhaust gas purification device 1 according to this embodiment of the present invention.

When the estimated temperature Tc obtained by the exhaust gas temperature estimation unit 41 is equal to or lower than the threshold (200° C., for example) during the PM forcible regeneration control and the LNT forcible regeneration control, the post injection is performed such that the respective catalyst temperatures of the oxidation catalyst 35 and the diesel oil decomposition catalyst 36 are raised to and maintained at the target temperature (no less than 200° C. to 250° C., for example). Under this temperature condition, thermal decomposition of the fuel (diesel oil) injected by the in-exhaust pipe injection valve 22 into HC and CO advances.

Hence, filter clogging occurring when the fuel injected by the in-exhaust pipe injection valve 22 adheres to the front surfaces of the diesel oil decomposition catalyst 36 and the downstream side LNT 31 and DPF 32, smoke generation occurring when fuel adhered to the exhaust pipe is vaporized, and so on can be effectively suppressed. The exhaust injection by the in-exhaust pipe injection valve 22 may of course be performed from a low exhaust gas temperature or a low load, and therefore a low temperature characteristic of the PM forcible regeneration and the LNT forcible regeneration can be improved.

Further, when the estimated temperature Tc obtained by the exhaust gas temperature estimation unit 41 is equal to or lower than the threshold (200° C.), fuel injection in the diesel engine 10 is performed through a multistage injection, and when the catalyst temperature of the oxidation catalyst 35 is held at or above the threshold (200° C.), the multistage injection is quickly halted and switched to a normal injection.

Hence, it is possible to limit the multistage injection, which has a greatly retarded injection pattern in comparison with a normal injection, only to the period during which the temperature of the oxidation catalyst 35 is raised, and therefore situations in which acceleration or the like is performed during the multistage injection such that combustion becomes unstable can likewise be limited. As a result, deterioration of the drivability due to acceleration failure or the like can be reduced effectively.

Further, the respective volumes of the oxidation catalyst 35 and the diesel oil decomposition catalyst 36 are set such that an acceptable S/V (100000 hr-1, for example) is realized when the diesel engine 10 is in an idling to low load operating state.

Therefore, increases in a manufacturing cost of the exhaust gas purification device 1 can be minimized.

Note that the present invention is not limited to the embodiment described above and may be amended appropriately within a scope that does not depart from the spirit of the present invention.

Figure 5:
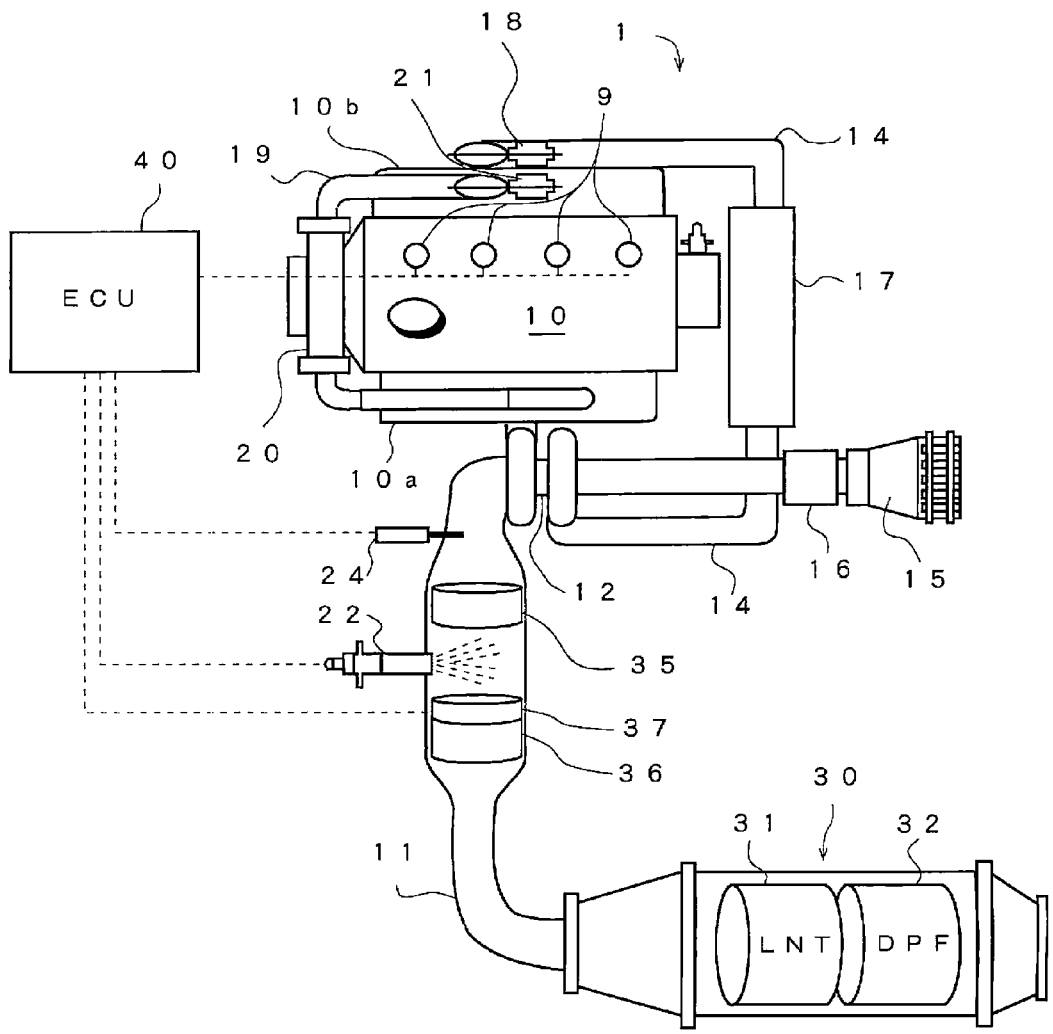
FIG. 5 is a schematic view showing a configuration of an exhaust gas purification device according to another embodiment.

As shown in FIG. 5, for example, an electric heater 37 may be provided in an upstream portion of the diesel oil decomposition catalyst 36, and an operation of the electric heater 37 may be controlled by an electric heater control unit (not shown) provided in the ECU 40. By operating the electric heater 37 to raise the temperature of the diesel oil decomposition catalyst 36 when the detection value Ts obtained by the exhaust gas temperature sensor 24 or the estimated temperature Tc obtained by the exhaust gas temperature estimation unit 41 is equal to or lower than the threshold (200° C.), thermal decomposition of the fuel (diesel oil) by the exhaust injection can be advanced such that the PM forcible regeneration and the LNT forcible regeneration can be performed effectively from a low exhaust gas temperature.

Figure 6:
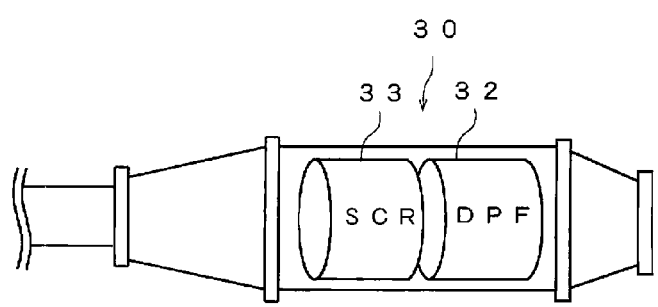
FIG. 6 is a schematic view showing a configuration of an exhaust gas post-processing device according to another embodiment.

Further, as shown in FIG. 6, the LNT 31 constituting the exhaust gas post-processing device 30 may be replaced by an SCR (SCR selective reduction catalyst) 33. In this case, a urea injection valve (not shown) may be provided on an upstream side of the SCR 33.

Furthermore, in the above embodiment, the LNT 31 and the DPF 32 or the SCR 33 and the DPF 32 of the exhaust gas post-processing device 30 are provided in that order from the upstream side. However, these components do not necessarily have to be disposed in this order, and the order may be changed appropriately.

Although the invention above has been described in connection with preferred embodiments of the invention, it will be evident for a person skilled in the art that several modifications are conceivable without departing from the invention as defined by the following claims.

The invention claimed is:

1. An exhaust gas purification device comprising an exhaust gas post-processing device provided in an exhaust passage of an internal combustion engine, exhaust passage fuel injector provided in said exhaust passage on an upstream side of said exhaust gas post-processing device, a first catalyst provided in said exhaust passage on an upstream side of said exhaust passage fuel injector, a second catalyst provided in said exhaust passage between said exhaust passage fuel injector and said exhaust gas post-processing device in order to perform thermal decomposition on fuel injected by said exhaust passage fuel injector, exhaust gas temperature estimation unit for detecting or estimating and outputting an exhaust gas temperature of said internal combustion engine, engine injection control unit for controlling fuel injection in said internal combustion engine, and regeneration control unit for controlling regeneration of said exhaust gas post-processing device, which is performed by causing said exhaust passage fuel injector to inject fuel, the exhaust gas purification device wherein when an output value output by said exhaust gas temperature estimation unit is equal to or lower than a threshold during regeneration control by said regeneration control unit, said engine injection control unit controls said fuel injection in said internal combustion engine by performing a multistage injection, which includes a post injection for supplying fuel to said first catalyst, in order to raise a catalyst temperature of said second catalyst to or above a threshold, and when the catalyst temperature of said first catalyst is held at or above the threshold, said engine injection control unit halts said multistage injection.

2. The exhaust gas purification device according to claim 1, further comprising an electric heater provided in an upstream portion of said second catalyst and an electric heater control unit for controlling an operation of said electric heater, wherein said electric heater control unit operates said electric heater when said output value output by said exhaust gas temperature estimation unit is equal to or lower than said threshold during said regeneration control by said regeneration control unit.

3. The exhaust gas purification device according to claim 1, wherein said first catalyst and said second catalyst each include a metal carrier and are formed integrally with said exhaust passage.

4. The exhaust gas purification device according to claim 1, wherein said exhaust gas post-processing device comprises a DPF and an LNT occlusion reduction catalyst.

5. The exhaust gas purification device according to claim 1, wherein said exhaust gas post-processing device comprises a DPF and an SCR selective reduction catalyst.

6. The exhaust gas purification device according to claim 2, wherein said first catalyst and said second catalyst each include a metal carrier and are formed integrally with said exhaust passage.

7. The exhaust gas purification device according to claim 2, wherein said exhaust gas post-processing device comprises a DPF and an LNT occlusion reduction catalyst.

8. The exhaust gas purification device according to claim 3, wherein said exhaust gas post-processing device comprises a DPF and an LNT occlusion reduction catalyst.

9. The exhaust gas purification device according claim 2, wherein said exhaust gas post-processing device comprises a DPF and an SCR selective reduction catalyst.

10. The exhaust gas purification device according claim 3, wherein said exhaust gas post-processing device comprises a DPF and an SCR selective reduction catalyst.

* * * * *